US009161032B2

(12) United States Patent
Hannuksela et al.

(10) Patent No.: US 9,161,032 B2
(45) Date of Patent: *Oct. 13, 2015

(54) PICTURE DELIMITER IN SCALABLE VIDEO CODING

(71) Applicant: Nokia Technologies Oy, Espoo (FI)

(72) Inventors: Miska Hannuksela, Ruutana (FI); Ye-Kui Wang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/289,794

(22) Filed: May 29, 2014

(65) Prior Publication Data
US 2014/0269940 A1    Sep. 18, 2014

Related U.S. Application Data

(63) Continuation of application No. 11/691,436, filed on Mar. 26, 2007, now Pat. No. 8,767,836.

(60) Provisional application No. 60/786,646, filed on Mar. 27, 2006.

(51) Int. Cl.
H04N 7/12        (2006.01)
H04N 19/31       (2014.01)
H04N 19/70       (2014.01)
H04N 19/46       (2014.01)
H04N 19/63       (2014.01)
(Continued)

(52) U.S. Cl.
CPC .......... *H04N 19/0043* (2013.01); *H04N 19/31* (2014.11); *H04N 19/37* (2014.11); *H04N 19/46* (2014.11); *H04N 19/61* (2014.11); *H04N 19/63* (2014.11); *H04N 19/70* (2014.11)

(58) Field of Classification Search
USPC .................. 375/240.1–240.26; 455/422.1
See application file for complete search history.

(56) References Cited

U.S. PATENT DOCUMENTS 6,069,575 A *     5/2000  Kinouchi et al. ............... 341/67
2005/0031308 A1*  2/2005  Fu et al. ........................ 386/94
2005/0163211 A1*  7/2005  Shanableh ................. 375/240.1
(Continued)

FOREIGN PATENT DOCUMENTS

WO    WO 2004/075554    9/2004
WO    WO 2005/079070    8/2005
(Continued)

OTHER PUBLICATIONS

Weigand et al., *Overview of the H.264/AVC video coding standard*. IEEE Transactions on Circuits and Systems for Video Technology, vol. 13, No. 7, Jul. 2003, p. 560-575, ISSM 1051-8215, Inspec AN 7715560, Section III.F Access Units, p. 564, Figure 4.
(Continued)

*Primary Examiner* — Amir Mehrmanesh
(74) *Attorney, Agent, or Firm* — Alston & Bird LLP

(57) ABSTRACT

The use of a picture delimiter that is contained in a NAL unit type value that is reserved in the current AVC or SVC specification. The present invention provides the scalability information for the H.264/AVC base layer in such a manner that bitstreams remain decodable with H.264/AVC decoders. In addition, the picture delimiter of the present invention may contain many other syntax elements that can help in easier processing of bitstreams compared to the plain H.264/AVC bitstream syntax.

6 Claims, 4 Drawing Sheets

(51) Int. Cl.
  *H04N 19/61* (2014.01)
  *H04N 19/37* (2014.01)

(56) References Cited

U.S. PATENT DOCUMENTS

| | | | |
|---|---|---|---|
| 2005/0201471 A1* | 9/2005 | Hannuksela et al. | 375/240.25 |
| 2006/0067406 A1* | 3/2006 | Kitada et al. | 375/240.16 |
| 2006/0195881 A1* | 8/2006 | Segev et al. | 725/116 |
| 2007/0189732 A1 | 8/2007 | Pothana et al. | |
| 2008/0214176 A1* | 9/2008 | Amon et al. | 455/422.1 |
| 2008/0216116 A1 | 9/2008 | Pekonen et al. | |
| 2010/0316362 A1 | 12/2010 | Jeon et al. | |

FOREIGN PATENT DOCUMENTS

| | | |
|---|---|---|
| WO | WO 2006/061838 | 6/2006 |
| WO | WO 2007/080502 | 7/2007 |

OTHER PUBLICATIONS

International Search Report for PCT Application No. PCT/IB2007/000757.
International Preliminary Report on Patentability/Written Opinion for Application No. PCT/IB2007/000757 dated Sep. 30, 2008.
Office Action for Mexican Patent Application No. MX/a/2008/012354, dated Aug. 31, 2010.
Office Action for U.S. Appl. No. 11/691,436 dated Nov. 4, 2011.
Office Action for U.S. Appl. No. 11/691,436 dated Sep. 13, 2012.
Office Action for U.S. Appl. No. 11/691,436 dated Mar. 5, 2013.
Notice of Allowance for U.S. Appl. No. 11/691,436 dated Feb. 19, 2014.
Examination Report for Indian Application No. 8195/DELNP/2008 dated Jul. 22, 2015.

* cited by examiner

PICTURE DELIMITER IN SCALABLE VIDEO CODING

CROSS-REFERENCE TO RELATED PATENT APPLICATIONS

This application is a continuation of U.S. application Ser. No. 11/691,436 filed Mar. 26, 2007, which claims priority to U.S. Provisional Application 60/786,646, filed Mar. 27, 2006, all of which are hereby incorporated herein in their entirety by reference.

FIELD

The present invention relates generally to the field of video coding. More particularly, the present invention relates to scalable video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). In addition, there are currently efforts underway with regards to the development of new video coding standards. One such standard under development is the scalable video coding (SVC) standard, which will become the scalable extension to H.264/AVC. Another such effort involves the development of China video coding standards.

SVC can provide scalable video bitstreams. A portion of a scalable video bitstream can be extracted and decoded with a degraded playback visual quality. Currently, a scalable video bitstream contains a non-scalable base layer and one or DLMR 304146.1 more enhancement layers. An enhancement layer may enhance the temporal resolution (i.e., the frame rate), the spatial resolution, or the quality of the video content represented by the lower layer or part thereof. In some cases, data of an enhancement layer can be truncated after a certain location, even at arbitrary positions, and each truncation position can include some additional data representing increasingly enhanced visual quality. Such scalability is referred to as fine-grained (granularity) scalability (FGS). In contrast to FGS, the scalability provided by a quality enhancement layer that does not provide fined-grained scalability is referred as coarse-grained scalability (CGS). Base layers can be designed to be FGS scalable as well.

The mechanism to provide temporal scalability in the most recent SVC specification involves the "hierarchical B pictures coding structure," which is essentially similar to current advanced video coding (AVC). This feature is fully supported by AVC, and the signaling portion can be implemented by using subsequence related supplemental enhancement information (SEI) messages.

For mechanisms to provide spatial and CGS scalabilities, a conventional layered coding technique, similar to the technique used in earlier standards, is used with a number of new inter-layer prediction methods. Data that could be inter-layer predicted includes intra texture, motion and residual. Single-loop decoding is enabled by a constrained intra texture prediction mode, whereby the inter-layer intra texture prediction can be applied to macroblocks (MBs) for which the corresponding block of the base layer is located inside intra MBs. At the same time, those intra MBs in the base layer use constrained intra prediction. In single-loop decoding, the decoder needs to perform motion compensation and full picture reconstruction only for the scalable layer desired for playback (referred to as the desired layer), thereby greatly reducing the decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

The spatial scalability has been generalized to enable the base layer to be a cropped and zoomed version of the enhancement layer. The quantization and entropy coding modules were adjusted to provide FGS capability. The coding mode is referred to as progressive refinement, wherein successive refinements of the transform coefficients are encoded by repeatedly decreasing the quantization step size and applying a "cyclical" entropy coding akin to sub-bitplane coding.

The scalable layer structure in the current draft SVC standard is characterized by three variables, referred to as temporal_level, dependency_id and quality_level. Temporal_level is used to indicate the temporal scalability or frame rate. A layer comprising pictures of a smaller temporal_level value has a smaller frame rate than a layer comprising pictures of a larger temporal_level. Dependency_id is used to indicate the inter-layer coding dependency hierarchy. At any temporal location, a picture of a smaller dependency_id value may be used for inter-layer prediction for coding of a picture with a larger dependency_id value. Quality level is used to indicate FGS layer hierarchy. At any temporal location and with an identical dependency_id value, an FGS picture with quality_level value equal to QL uses the FGS picture or base quality picture (i.e., the non-FGS picture when QL−1=0) with quality_level value equal to QL−1 for inter-layer prediction.

One design goal of SVC is to maintain the backward compatibility with AVC. In other words, the base layer should be compliant with AVC. To realize this goal, two new NAL unit types that are reserved in AVC are used for the coded slices in enhancement layers. The three variables—temporal_level, dependency_id and quality_level—among other information (including simple_priority_id and discardable_flag) are signaled in the bitstream for the enhancement layers. Simple_priority_id indicates a priority of the NAL unit, and discardable_flag indicates whether the NAL unit is used for inter-layer prediction by any layer with a higher dependency_id value.

Conventional video coding standards have specified a structure for an elementary bitstream, i.e., a self-containing bitstream that decoders can parse. The bitstream has comprised several layers, typically including several of the following: a sequence layer, a group of pictures (GOP) layer, a picture layer, a slice layer, a macroblock layer, and a block layer. The bitstream for each layer typically includes a header and associated data.

The syntax for H.264/AVC and SVC coding standard includes Network Abstraction Layer (NAL) units. A stream of NAL units does not form an elementary bitstream as such because there are no start codes in NAL units. Instead, NAL units have to be framed with start codes according to Annex B of the H.264/AVC coding standard to form an elementary bitstream.

The H.264/AVC coding standard contains headers at the slice layer and below, but it does not include picture, GOP, or sequence headers. Instead, a concept of a parameter set replaces such headers. There are two types of parameter sets: sequence parameter sets and picture parameter sets. In the H.264/AVC coding standard, only one sequence parameter set is active in a coded video sequence, i.e., between an instantaneous decoding refresh (IDR) picture, inclusive, to the next IDR picture, exclusive. Only one picture parameter set is active within a picture, but a new picture parameter set may be activated per each picture. In SVC, each value of dependency_id may be dedicated its own sequence parameter set.

An access unit according to the H.264/AVC coding standard comprises one primary coded picture, zero or more redundant coded pictures, and zero or more auxiliary coded pictures. In some systems, detection of access unit boundaries can be simplified by inserting an access unit delimiter NAL unit into the bitstream. An access unit according to SVC may comprise one primary coded picture for the base layer and may contain multiple enhanced coded pictures, but at most one enhanced coded picture that is not a redundant coded picture per each unique combination of dependency_id, temporal_level, and quality_level.

The base layer of SVC streams is typically AVC-compliant, i.e., AVC decoders can decode the base layer of an SVC stream and ignore SVC-specific data. This feature has been realized by specifying coded slice NAL unit types that are specific to SVC and were reserved for future use in AVC and required to be skipped according to the AVC specification.

An access unit delimiter is a NAL unit specified in H.264/AVC that may be inserted as the first NAL unit of an access unit. The access unit delimiter contains the picture coding type of the primary picture of the access unit.

The variables temporal_level, dependency_id, quality_level, simple_priority_id and discardable_flag are signaled for SVC enhancement layers but not for the base layer. Instead, the variables are either not specified (discardable_flag) or are derived as equal to zero (the other four variables) for the AVC compatible base layer according to the SVC specification. However, this causes a problem that important information cannot be signaled for the base layer as efficiently as for enhancement layers (the AVC compatible base layer always has dependency_id and quality_level equal to 0). First, the temporal scalability hierarchy of a base layer picture, i.e., which values of temporal_level pertain to AVC base layer using the subsequence feature, cannot be signaled. Second, it cannot be signaled whether a base layer picture or a part of a base layer picture is used for inter-layer prediction by any layer with a higher dependency_id value, i.e., the value of discardable_flag. Third, a desired priority value for a base layer picture, i.e., the value simple_priority_id, cannot be signaled.

Although there are potential methods to effectual some of this signaling, each has its own drawbacks. For example, although the Sub-sequence information Supplemental Enhancement Information (SEI) message in AVC could be used to signal the temporal scalability hierarchy of the base layer, the message contains a number of syntax elements in addition to temporal_level (corresponding to the subseq_layer syntax element in the Sub-sequence information SEI message), leading to potential inefficiency in terms of bitrate. Conventional video coding standards use a picture header to separate coded pictures and to carry picture-specific syntax elements.

SUMMARY

The present invention provides the use of a picture delimiter that is contained in a NAL unit type value (14 in various embodiments) that is reserved in the current AVC or SVC specification. The invention provides the scalability information for the H.264/AVC base layer in such a manner that bitstreams remain decodable with H.264/AVC decoders. In addition, the picture delimiter elementary data unit of the present invention may contain many other syntax elements that can help in easier processing of bitstreams compared to the plain H.264/AVC bitstream syntax.

The present invention possesses a number of significant advantages over conventional approaches. The present invention enables the signaling of the temporal scalability hierarchy, as well as other information for the AVC-compatible base layer SVC scalable streams without breaking the backward compatibility, as the picture delimiter NAL units can be discarded by an AVC decoder. The present invention also makes bitstream parsing easier, as many operations can be performed based on coded pictures rather than individual NAL units. In contrast, H.264/AVC and SVC standards specify a decoding process that is based on NAL units. In many systems, no additional framing or encapsulation of pictures is provided, but rather bitstream parsing is done NAL unit by NAL unit. It sometimes requires in-depth parsing of the bitstream to conclude whether a picture is useful to produce a desired decoding result. This is particularly true in special operations, such as seeking and fast forward play. In the seeking operation, for example, the decoder has to search for an IDR NAL unit, then rewind back to the position where the corresponding access unit starts (e.g. parameter sets SEI NAL units can precede an IDR NAL unit in the access unit), and start decoding after that.

Unlike some conventional implementations, the picture delimiter of the present invention is specified in the context of the video bitstream instead of file format or RTP payload format. This allows video decoders to make use of the information included in the picture delimiter (i.e., omit decoding of unnecessary pictures). Similar information in file format and RTP payload format may not be available for the decoder.

In contrast to picture headers, a picture delimiter of the present invention may contain syntax elements affecting the decoding process of the H.264/AVC compatible base layer when at least one enhancement layer is present. Such conditional decoding has not been specified for picture headers. A picture header is an integral part of the bitstream syntax in the convention codecs (i.e., the picture header is always present for each picture in the bitstream). A picture delimiter is not specified in H.264/AVC but H.264/AVC decoders can safely ignore it (i.e., it does not affect the decoding process of H.264/AVC compatible base layer).

Various embodiments of the present invention include an encoder generating a picture delimiter, as well as a decoder that parses a picture delimiter and omits decoding of the picture on the basis of the value of the picture delimiter and desired operation point, such as layers/temporal_level for playback. Embodiments of the present invention also include a bitstream parser which passes NAL units to the decoder and removes pictures on the basis of the value of the picture delimiter.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION

The present invention involves the use of a picture delimiter in scalable video coding. The picture delimiter can either precede the first coded picture in the access unit or precede any other coded picture in the access unit. Due to certain constraints in the AVC specification, a NAL unit type from a different range of values is selected for the picture delimiter preceding the first coded picture (i.e., the primary coded picture in the base layer) in an access unit than for the picture delimiter preceding any other coded picture in an access unit. The term "picture delimiter" is used collectively for both NAL unit types herein. A picture delimiter NAL unit preceding the first coded picture of an access unit is referred to as primary coded picture description NAL unit, and a picture delimiter NAL unit preceding any other coded picture of an access unit is referred to as subsequent coded picture description NAL unit. NAL unit type values are selected among those which are reserved in the current AVC and SVC specifications, such as 14 for the primary coded picture description NAL unit and 22 for the subsequent coded picture description NAL unit.

The picture delimiter concerns a coded picture and is the first NAL unit of the coded picture in decoding order. It should be noted that a bitstream to be decoded can be received from a remote device located within virtually any type of network. Additionally, a bitstream can be received from local hardware or software. It should also be understood that, although text and examples contained herein may specifically describe an encoding process, one skilled in the art would readily understand that the same concepts and principles also apply to the corresponding decoding process and vice versa.

Figure 4:
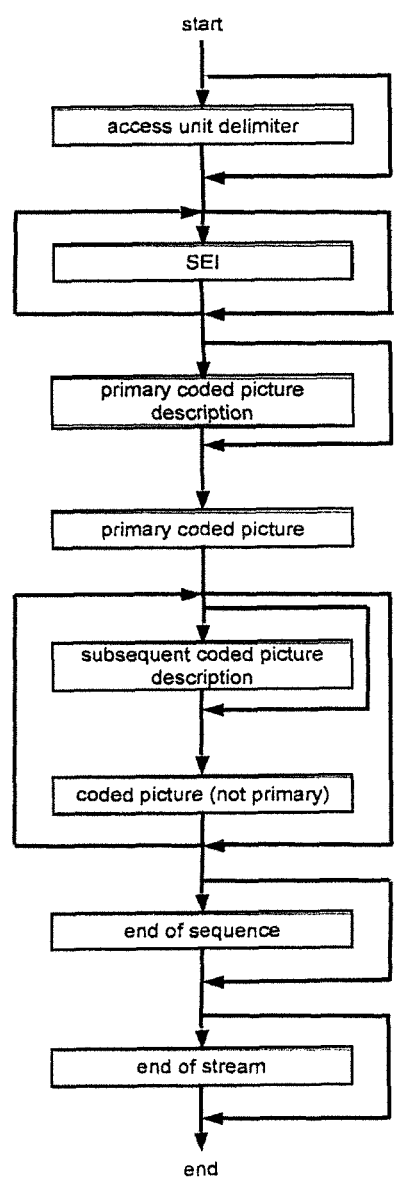
FIG. 4 is a representation of a structure of an access unit according to various embodiments of the present invention.

The decoding order of the primary coded picture description NAL unit precedes the VCL NAL units of the primary coded picture in the base layer. A NAL unit type of 14 is used because it is one of the reserved values that can start a new access unit. FIG. 4 describes the decoding order of the primary coded picture description NAL unit and subsequent coded picture description access unit relative to the other NAL units in the access unit.

NAL unit type 14 used for the primary coded picture description NAL unit is one unit type whose presence signals the start of a new access unit if it is the first NAL unit of those that can start a new access unit. Therefore, it can be used for the primary coded picture (in the base layer) only. Consequently, another NAL unit type (22) is used for the subsequent coded picture description NAL unit. The AVC specification constrains NAL unit type 22 not to precede the first VCL NAL unit of the primary coded picture (in the base layer), and therefore NAL unit type 22 cannot be used for the primary coded picture description NAL unit. The syntax structure for the two NAL units (primary coded picture description and subsequent coded picture description) may or may not be identical in different embodiments of the present invention. It should therefore be understood that both the primary coded picture description and the subsequent coded picture description of the present invention can incorporate the syntax and information described herein.

The picture delimiter of the present invention contains at least one of the following set of information:

1. A temporal scalability hierarchy.
2. A priority identifier.
3. A key picture indicator.
4. An indication as to whether a complete picture or a part of a picture or no part of a picture is used for inter-layer prediction by any layer with a higher dependency_id value.
5. An indicator signaling whether the picture is a non-reference/reference picture contains NAL units that shall not be discarded (such as parameter sets), and/or or the maximum values of nal_ref_idc of different sets of NAL units.
6. A redundant picture indicator indicating whether the picture is a coded redundant picture.
7. An auxiliary picture indicator indicating whether the picture is a coded auxiliary picture.
8. An instantaneous decoding refresh (IDR) picture indicator, signaling that the picture and all the following pictures with the same value of dependency_id can be correctly decoded without reference to any picture preceding them and having the same value of dependency_id.
9. An indicator signaling that the picture and all the following pictures with the same value of dependency_id as the picture can be correctly decoded without reference to any of those pictures that are preceding them and have the same value of dependency_id and have the same or greater value of temporal_level. This indicator also signals that the bitstream can be switched to the temporal_level of the picture with this indicator from a temporal layer with other value of temporal_level and with the same value of dependency_id.
10. An intra picture indicator, signaling that the picture can be decoded without reference to any picture preceding it.
11. An indicator signaling that the picture can be decoded without reference to any picture preceding it and having the same value of dependency_id.
12. A self-contained random access picture indicator, signaling that the picture and all the following pictures can be correctly decoded without reference to any picture preceding them and all data, including the parameter sets, is included in the bitstream for the picture and the pictures following it.
13. A picture type indicator indicating what types of slices may be present in the coded picture.
14. An indicator which parts of the decoding process are required for decoding of the picture (e.g. if the picture is an intra coded picture then those inter prediction decoding processes are not required).
15. An indicator of restrictions applied in the syntax and semantics of the coded picture, such as arbitrary slice ordering indicator (signaling whether slices of a picture are in raster-scan order) and flexible macroblock ordering indicator (signaling whether macroblocks in any slice of a picture are always next to each other in raster-scan order).
16. Modifications to a picture parameter set that are only applicable in the current picture. For example, a slice group map telling the allocation of each block to a slice group.
17. An indicator for the possible presence of errors or mismatches in the coded picture.

Example syntax of the picture delimiter for scalability information according to various embodiments of the present invention is depicted as follows. The values of these syntax elements are applied for the decoding of the primary coded picture (in the base layer) in an SVC access unit. Note also that potential future extensions to this NAL unit are enabled with the loop statement "while(more_rbsp_data( ))".

| primary_coded_pic_descr() { | C | Descriptor |
|---|---|---|
| simple_priority_id | 11 | u(6) |
| key_pic_flag | 11 | u(1) |
| temporal_level | 11 | u(3) |
| while( more_rbsp_data( ) ) | | |
| rbsp_trailing_bits( ) | 11 | |
| } | | |

In the table presented above, the "C" column indicates the "Category" of the syntax elements. Because the picture delimiter is a new syntax structure, a category value (11) that was unused previously is used in these particular embodiments. However, other unused category values could also be used.

Simple_priority_id specifies a priority identifier for the VCL NAL units of the coded picture. If each of the VCL NAL units of the picture is associated with a syntax element simple_priority_id in the NAL unit header or in the referred sequence parameter set, the value of simple priority id in the picture delimiter is equal to the value of the simple priority id in the NAL unit header or sequence parameter set.

Temporal_level specifies a temporal_level for the coded picture. If each of the VCL NAL units of the picture is associated with a syntax element temporal_level in the NAL unit header or in the referred sequence parameter set, the value of temporal_level in the picture delimiter is equal to the value of the temporal_level in the NAL unit header or sequence parameter set.

A key_pic_flag equal to 1 in the primary coded picture description NAL unit indicates that the primary coded picture in the base layer is a base representation of a key picture. A key_pic_flag equal to 0 in the primary coded picture description NAL unit indicates that the primary coded picture in the base layer is not a base representation of a key picture. Key pic flag in the subsequent coded picture description NAL unit indicates that the corresponding coded picture is a key picture. The variable Key_Picture_Flag used in the SVC decoding process is set equal to key_pic_flag. It should also be noted that, in various embodiments of the present invention, the key_pic_flag is added into the slice header syntax for slices according to the scalable extension. When a key picture in an AVC base layer is identified, the desired layer to be decoded has a dependency_id equal to 0, and a quality_level greater than 0, then the key picture in the AVC base layer is completely decoded. Generally, when a key picture having a quality_level equal to 0 is identified, the desired layer to be decoded has a quality_level greater than 0, and the desired layer to be decoded has the same dependency_id as for the key picture, the key picture is completely decoded.

Figure 1:
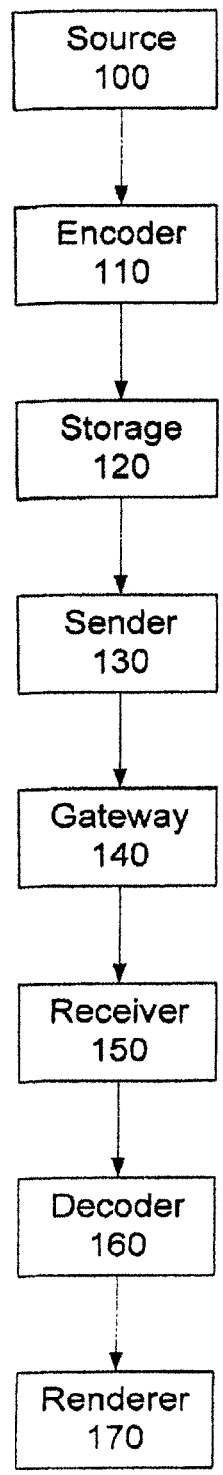
FIG. 1 shows a generic multimedia communications system for use with the present invention.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e., omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

Alternatively, the coded media bitstream may be transferred from the sender 130 to the receiver 150 by other means, such as storing the coded media bitstream to a portable mass memory disk or device when the disk or device is connected to the sender 130 and then connecting the disk or device to the receiver 150.

The system includes one or more receivers 150, typically capable of receiving, de-modulating, and de-capsulating the transmitted signal into a coded media bitstream. De-capsulating may include the removal of data that receivers are incapable of decoding or that is not desired to be decoded. The codec media bitstream is typically processed further by a decoder 160, whose output is one or more uncompressed media streams. Finally, a renderer 170 may reproduce the uncompressed media streams with a loudspeaker or a display, for example. The receiver 150, decoder 160, and renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Figure 2:
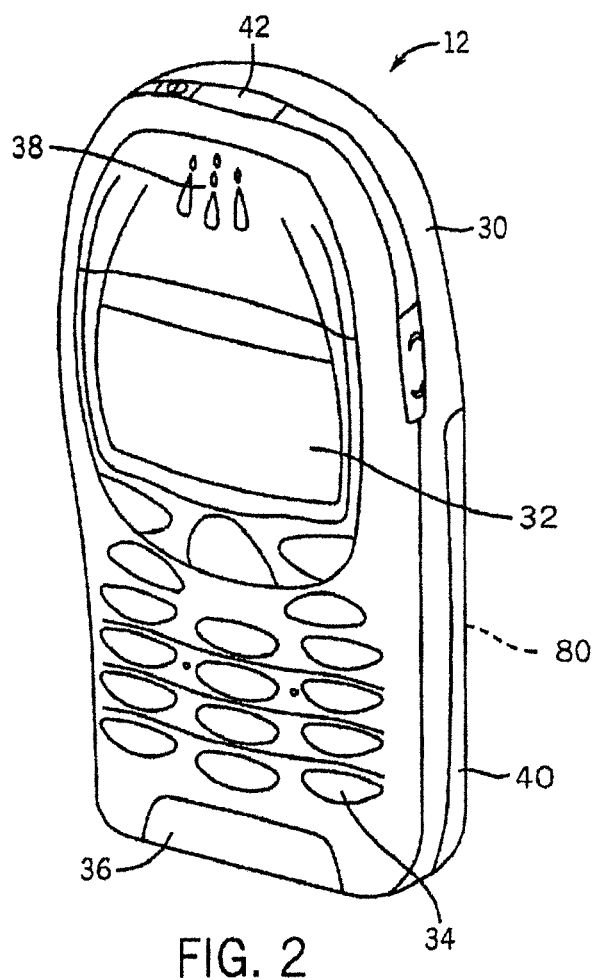
FIG. 2 is a perspective view of a mobile telephone that can be used in the implementation of the present invention.
Figure 3:
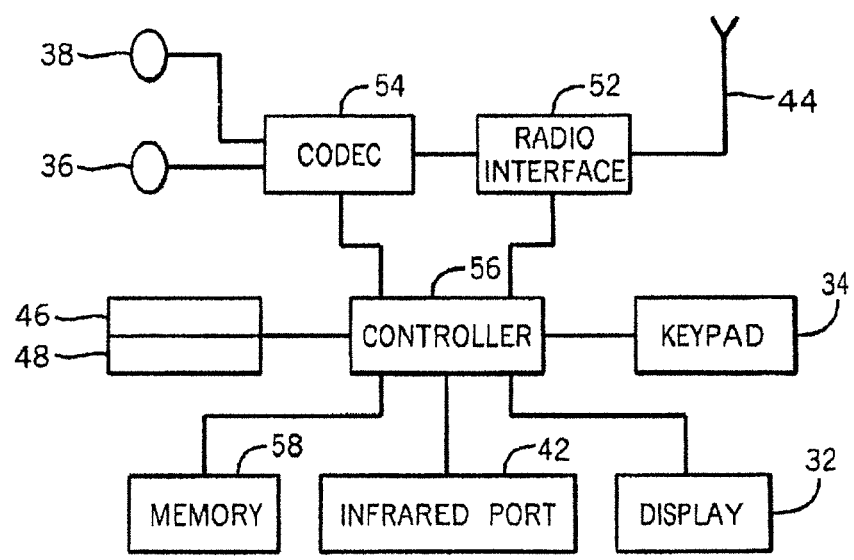
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. Some or all of the features depicted in FIGS. 2 and 3 could be incorporated into any or all of the devices represented in FIG. 1.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for decoding an encoded video signal comprising:

decoding at least one picture delimiter elementary data unit included in an access unit of a scalable video coding encoded video signal, the at least one picture delimiter elementary data unit associated with a first picture decodable according to a first algorithm, the at least one picture delimiter elementary data unit precedes the first picture and is configured to be selectively ignored during the decoding of a subset of the encoded video signal in accordance with the first algorithm, the at least one picture delimiter elementary data unit includes syntax elements for a temporal level identification and a priority identifier for the first picture associated with the at least one picture delimiter elementary data unit; and utilizing information contained in the at least one picture delimiter elementary data unit for decoding a subsequent elementary data unit of the encoded video signal;

wherein the first picture represents the primary coded picture in the base layer of the encoded video signal and wherein the at least one picture delimiter elementary data unit includes further syntax elements affecting the decoding process of the primary coded picture in the base layer when at least one enhancement layer is present.

2. The method of claim 1 wherein information contained within the at least one picture delimiter elementary data unit is utilized by omitting the decoding of the first picture associated with the at least one picture delimiter elementary data unit.

3. A computer program product, embodied in a non-transitory computer readable medium with computer program instructions stored therein, for decoding an encoded video signal, comprising:

computer code for decoding at least one picture delimiter elementary data unit included in an access unit of a scalable video coding encoded video signal, the at least one picture delimiter elementary data unit associated with a first picture decodable according to a first algorithm, the at least one picture delimiter elementary data unit precedes the first picture and is configured to be selectively ignored during the decoding of a subset of the encoded video signal in accordance with the first algorithm, the at least one picture delimiter elementary data unit includes syntax elements for a temporal level identification and a priority identifier for the first picture associated with the at least one picture delimiter elementary data unit; and computer code for utilizing information contained in the at least one picture delimiter elementary data unit for decoding a subsequent elementary data unit of the encoded video signal;

wherein the first picture represents the primary coded picture in the base layer of the encoded video signal and wherein the at least one picture delimiter elementary data unit includes further syntax elements affecting the decoding process of the primary coded picture in the base layer when at least one enhancement layer is present.

4. The computer program product of claim 3 wherein information contained within the at least one picture delimiter elementary data unit is utilized by omitting the decoding of the first picture associated with the at least one picture delimiter elementary data unit.

5. An electronic device, comprising:
a processor; and
a memory unit communicatively connected to the processor and including computer program instructions, the memory unit and the computer instructions being configured to, in cooperation with the processor, cause the electronic device to:
decode at least one picture delimiter elementary data unit included in an access unit of a scalable video coding encoded video signal, the at least one picture delimiter elementary data unit associated with a first picture decodable according to a first algorithm, the at least one picture delimiter elementary data unit precedes the first picture and is configured to be selectively ignored during the decoding of a subset of the encoded video signal in accordance with the first algorithm, the at least one picture delimiter elementary data unit includes syntax elements for a temporal level identification and a priority identifier for the first picture associated with the at least one picture delimiter elementary data unit; and
utilize information contained in the at least one picture delimiter elementary data unit for decoding a subsequent elementary data unit of the encoded video signal;
wherein the first picture represents the primary coded picture in the base layer of the encoded video signal and wherein the at least one picture delimiter elementary data unit includes further syntax elements affecting the decoding process of the primary coded picture in the base layer when at least one enhancement layer is present.

6. The electronic device of claim 5 wherein information contained within the at least one picture delimiter elementary data unit is utilized by omitting the decoding of the first picture associated with the at least one picture delimiter elementary data unit.

* * * * *